US008425960B2

(12) United States Patent  
Inisan et al.

(10) Patent No.: US 8,425,960 B2
(45) Date of Patent: Apr. 23, 2013

(54) MODIFICATION OF THE COLOR HUE OF ANTHOCYANINS FOR THE OBTENTION OF COLORING SUBSTANCES

(75) Inventors: Claude Inisan, Betton (FR); Matthieu Besnard, Liffre (FR); Cecile Bahu, Saint Etienne en Cogles (FR); Denis Megard, Saint Brice en Cogles (FR)

(73) Assignee: Diana Naturals, Antrain (FR)

( * ) Notice: Subject to any disclaimer, the term of this patent is extended or adjusted under 35 U.S.C. 154(b) by 384 days.

(21) Appl. No.: 12/593,503

(22) PCT Filed: Mar. 17, 2008

(86) PCT No.: PCT/FR2008/050454
§ 371 (c)(1),
(2), (4) Date: Sep. 28, 2009

(87) PCT Pub. No.: WO2008/129215
PCT Pub. Date: Oct. 30, 2008

(65) Prior Publication Data
US 2010/0121084 A1     May 13, 2010

(30) Foreign Application Priority Data

Mar. 28, 2007   (FR) ...................................... 07 54106

(51) Int. Cl.
*A23L 1/275* (2006.01)
*C07H 17/065* (2006.01)
*C07D 311/62* (2006.01)

(52) U.S. Cl.
USPC ............... 426/250; 536/8; 536/18.1; 549/399

(58) Field of Classification Search ............. 536/8, 18.1; 426/531, 268, 270, 540, 250; 549/399
See application file for complete search history.

(56) References Cited

U.S. PATENT DOCUMENTS 4,481,226 A * 11/1984 Crosby et al. ................ 426/540

FOREIGN PATENT DOCUMENTS
EP       0096481       12/1983
WO     WO 03/010240    2/2003

OTHER PUBLICATIONS

Bakker et al., "Isolation, Identification, and Characterization of New Color-Stable Anthocyanins Occurring in Some Red Wines," *J. Agric. Food Chem.*, 45:35-43, 1997.
Brouillard et al., "Polyphenols produced during red wine ageing," *BioFactors*, 6:403-410, 1997.
Brouillard et al., "Why are grape/fresh wine anthocyanins so simple and why is it that red wine color lasts so long?" *Phytochemistry*, 64:1179-1186, 2003.
Es-Safi et al., "New polyphenolic compounds with xanthylium skeletons formed through reaction between (+)—cathechin and glyoxylic acid," *Agric. Food Chem.*, 47:5211-5217, 1999.
Es-Safi et al., "Role of aldehydic derivatives in the condensation of phenolic compounds with emphasis on the sensorial properties of fruit-derived foods," *J. Agric. Food Chem.*, 50:5571-5585, 2002.
Es-Safi et al., "Study of the reactions between (+)—catechin and furfural derivatives in the presence or absence of anthocyanins and their implication in the food color change," *J. Agric. Food Chem.*, 48:5946-5954, 2000.
Hillebrand et al., "Characterization of Anthocyanins and Pyranoanthocyanins from Blood Orange [*Citrus sinensis* (L.) Osbeck] Juice," *J. Agric. Food Chem.*, 52:7331-7338, 2004.
Schwarz et al., "Isolation and Identification of Novel Pyranoanthocyanins from Black Carrot (*Daucus carota* L.) Juice," *J. Agric. Food Chem.*, 52:5095-5101, 2004.
Timberlake et al., "Anthocyanins: Colour augmentation with catechin and acetaldehyde," *J. Sci. Fd. Agric.*, 28:539-544, 1977.

* cited by examiner

*Primary Examiner* — Bernard Dentz
(74) *Attorney, Agent, or Firm* — Fulbright & Jaworski L.L.P.

(57) ABSTRACT

The present invention relates to a coloring food composition containing modified colorings of the anthocyanin family and to a process for the bathochromic modification of these colorings.

This coloring composition can be used as additive or ingredient in food preparations.

29 Claims, 4 Drawing Sheets

MODIFICATION OF THE COLOR HUE OF ANTHOCYANINS FOR THE OBTENTION OF COLORING SUBSTANCES

This application is a national phase application under 35 U.S.C. §371 of International Application No. PCT/FR2008/050454 filed 17 Mar. 2008, which claims priority to French Application No. 0754106 filed 28 Mar. 2007. The entire text of each of the above-referenced disclosures is specifically incorporated herein by reference without disclaimer.

The present invention relates to a coloring food composition containing modified colorings of the anthocyanin family and to a process for the bathochromic modification of these colorings.

This coloring composition can be used as additive or ingredient in food preparations.

A food coloring is a natural or synthetic additive used or intended to be used mainly for increasing or recovering the color of a foodstuff.

Natural colorings are increasingly used in foods. They are aqueous extracts or oleoresins obtained generally from the pigments of fruits, vegetables, seeds or spices.

The anthocyanins derived from plants that are naturally rich in anthocyanins (e.g. purple carrot, elderberry, red cabbage, hibiscus, blackcurrant, purple corn, purple potato and the like) have a general structure of the type

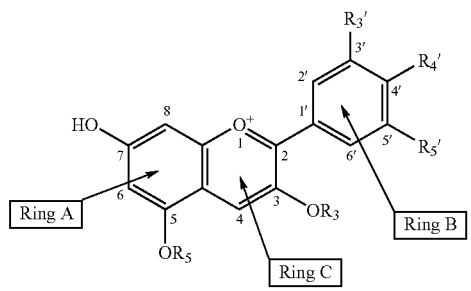

Among the natural colorings, the commercially available anthocyanin colorings have various color hues according to their origin, that is to say according to the fruit or vegetable from which they are derived.

Table 1 compares the relative blue hues of the main sources that are commercially available.

|  | Stability | Value of b* in the CIE La*b* system (L set at 65) |
|---|---|---|
| Radish | Good | 30 |
| Flowers & red fruits (elderberry, chokeberry, hibiscus) | Low | 15/25 |
| Purple carrot | Good | 7/10 |
| Grape | Average | −5/+5 |
| Red cabbage | Good | −20/−10 |

The 1976 CIE La*b* notation defines a colorimetric space in which each color is defined by three parameters (L*, a* and b*).
The parameter L* reflects the brightness of the color, the value L* being equal to 0 for black and 100 for absolute white. The higher the value of L*, the less intense the coloration.
The parameter a* corresponds to the axis of the antagonistic pair green/red.
The parameter b* corresponds to the axis of the antagonistic pair blue/yellow.

It is known in particular that anthocyanins and particularly their conversion during winemaking or during the storage of wine leads to blueing colorations (Brouillard R. et al., *Phytochemistry*, 64, 2003, 1179-1186, Brouillard R. et al., *BioFactors*, 6, 1997, 403-410, Bakker J. & Timberlake C. F., *J. Agric. Food Chem.*, 45, 1997, 35-43).

These chemical conversions explain the formation of tannins and the good stability of anthocyanins in wine after winemaking. Indeed, while grape anthocyanins are relatively unstable, wines preserve their pigments for long periods.

Among the chemical conversions, condensation reactions are caused by the presence, in wine, of aldehydes and polyphenols derived from grape. These polyphenols belong to the flavanol family, the most widespread of which is catechin. The structure of flavanols has the same backbone as that of the anthocyanins and the numbering of the atoms is identical.

Timberlake has described the formation of an aldehyde bridge between the $C_8$ carbon of anthocyanin and the $C_8$ carbon of flavanol (Timberlake C. F. & Bridle P., *J. Sci. Fd Agric.*, 28, 1977, 539-544). However, the structure formed does not exhibit blueing.

The formation of pyranoanthocyanins has also been described in wine: this anthocyanin structure is obtained by the reaction of pyruvic acid present in grape with the $C_4$ carbon of anthocyanin, which forms a new ring with the hydroxyl at the $C_5$ position. The vinyl structure thus formed can react with the acetaldehyde and then with various flavanols. These novel structures exhibit a high bathochromic effect (blueing) compared with the starting anthocyanins. Numerous structures have thus been determined in wine.

However, these reactions are very slow and occur over several months, or even several years.

Pyranoanthocyanins can also be obtained by nucleophilic addition of vinylphenols onto anthocyanin. Pyranoanthocyanins exhibit a hypsochromic effect (reddening) compared with the starting anthocyanin.

Natural pyranoanthocyanins have been identified in purple carrot (Schwarz M., et al., *J. Agric. Food Chem.*, 52, 2004, 5095-5101), and in blood orange (Hillebrand S., et al., *J. Agric. Food Chem.*, 52, 2004, 7331-7338). In both cases, the formation of pyranoanthocyanins is observed after a long period of storage of the juices. The derivatives formed all exhibit a hypsochromic shift of their $\lambda_{max}$ of about twenty nanometers, of the order of 530 to 510 nm, corresponding to a reddening of the hue.

Other condensation reactions between an anthocyanin and a polyphenol are known, for example a direct condensation which occurs between the $C_4$ of anthocyanin and the $C_8$ of flavanol. This reaction is very slow and the product of the reaction exhibits a hypsochromic effect compared with the starting anthocyanin.

It is also possible to perform a condensation in the presence of an aldehyde. In this case, the aldehyde forms a bridge between the $C_8$ of the anthocyanin and the $C_8$ of the flavanol and the structure formed shows no blueing.

A blue coloring derived from anthocyanins is known (WO 03/010240). The process for obtaining the blue color in this case results from the complexing of the anthocyanins with aluminum, which makes it possible to stabilize the quinone form of the chromophore, giving a bathochromic effect. The quantity of aluminum introduced into the medium in order to obtain the bathochromic effect is however not negligible and the harmful impact in terms of public health is to be taken into consideration.

Moreover, other heavy metals such as molybdenum or tungsten also make it possible to obtain a bathochromic effect but, here again, the quantities necessary are unacceptable for a food use.

A need still exists for natural colorings which can replace synthetic colorings in some food applications.

The applicant has developed a novel coloring composition having a blue hue, which constitutes the subject of the invention.

The subject of the invention is also a process for producing this coloring composition.

Another subject consists in the applications of this coloring composition as additive or ingredient during the manufacture of food products.

Other subjects will emerge on reading the description and the examples which follow.

The coloring composition in accordance with the invention comprises modified colorings of the anthocyanin family which are present in a natural product of plant origin.

The expression modified colorings is understood to mean substances capable of coloring foods once added to the food products, confectionery products, drinks and other similar products intended to be ingested.

There are numerous plants which are naturally rich in anthocyanins (e.g. purple carrot, elderberry, red cabbage, hibiscus, blackcurrant, purple corn, purple potato and the like).

Preferably, the natural product of plant origin used is red cabbage, purple carrot or elderberry.

Figure 1:
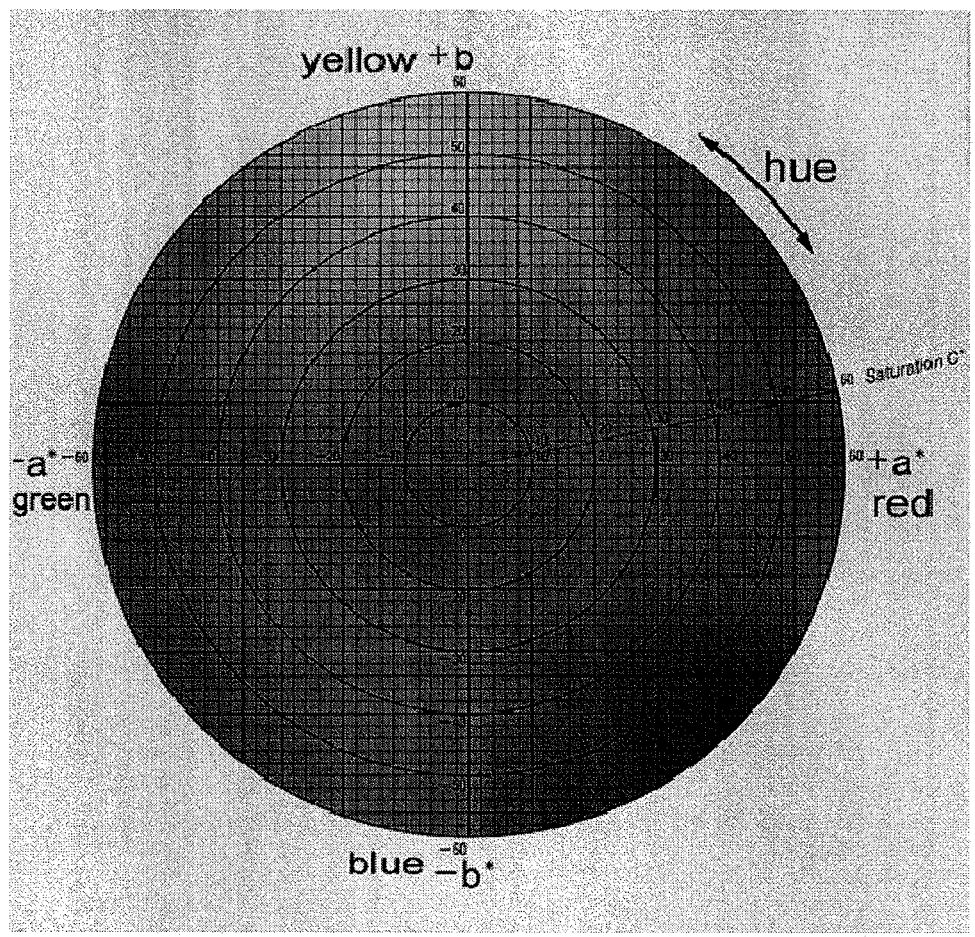
FIG. 1 shows the integrating sphere representing the three axes La*b* in the CIE L*a*b* system.

In order to be able to compare the hue of various sources of anthocyanins in solution, it is necessary to normalize the measurement of the La*b* values in the CIE L*a*b* system (FIG. 1, representing the integration sphere). The reading is performed in an aqueous solution buffered to pH 3.00±0.05 at 20° C. and the value of L is arbitrarily set at 65±0.5.

The measurement of the color is carried out with an La*b* spectrocolorimeter: the color is thus defined by 3 coordinates represented on a sphere (FIG. 1).

Red cabbage traditionally has a value of b* in the "1976 CIE L*a*b*" model system around −15. In the case of red cabbage, the coloring composition with a blue hue according to the invention is such that the value of b* in the "1976 CIE L*a*b*" model is less than −25 for the pH values and L value previously set. Preferably, this value is less than −30. More preferably, it is less than −35 and more preferably still it is less than −40 for the pH values and L value previously set.

Purple carrot (*Daucus carota*) has a value of b* in the "1976 CIE L*a*b*" model system of 7 to 10. The purple carrot-based coloring composition of the invention is such that the value of b* in the "1976 CIE L*a*b*" model is less than 4 for the pH values and L value previously set. Preferably, this value is less than 2. More preferably, it is less than 0 and more preferably still it is less than −2 for the pH values and L value previously set.

Elderberry has a value of b* in the "1976 CIE L*a*b*" model system of 10 to 20. In the case of elderberry, the coloring composition of the invention is such that the value of b* in the "1976 CIE L*a*b*" model is less than 5 for the pH values and the value of L previously set. Preferably, this value is less than 3. More preferably, it is less than 1 and more preferably still it is less than −1 for the pH values and the value of L previously set.

The process for the bathochromic modification of the colorings of the anthocyanin family present in a natural product of plant origin is characterized by the fact that these anthocyanins are reacted with at least one aldehyde.

The modified anthocyanins derived from the product of plant origin are of the general formula:

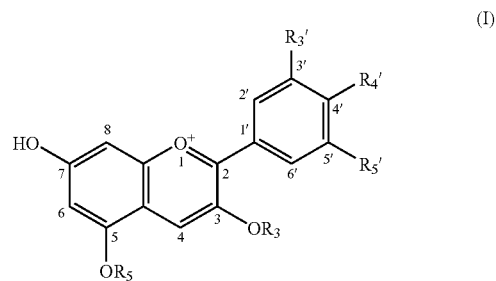

(I)

in which $R_3'$, $R_4'$ and $R_5'$ are independently H, OH, or $OCH_3$ and $R_3$ and $R_5$ are independently H or an acetylated or non-acetylated glycoside.

The bathochromic modification process makes it possible to obtain a reduction in b* of at least 5 units in the modified anthocyanins compared with the unmodified anthocyanins, in a "1976 CIE L*a*b*" model system, L being set at 65±0.5 and the measurements being performed in an aqueous solution buffered at pH 3.00±0.05 at 20° C.

Preferably, the aldehyde(s) is (are) chosen from the group consisting of the aldehydes of formula (II) $R_6$—CHO with $R_6$ being a $C_1$ to $C_8$ alkyl or alkenyl, or $R_6$ being COOH—$R_7$ or CHO—$R_7$ with $R_7$ being a $C_0$ to $C_8$ alkyl or alkenyl, or $R_6$ being a saturated or unsaturated hydrocarbon ring optionally comprising at least one heteroatom N, O or S.

Preferably, the process according to the invention is characterized by the fact that at least one aldehyde is chosen from acetaldehyde, butyraldehyde, valeraldehyde, propionaldehyde, isovaleraldehyde, isobutaraldehyde, salicylaldehyde, benzaldehyde, 2,3-dihydroxybenzaldehyde, furaldehyde, t-cinnamaldehyde, glutaraldehyde, glyoxylic acid, glyoxal.

More preferably, at least one aldehyde is chosen from glyoxylic acid or furaldehyde.

The aldehyde may be added to the solution of anthocyanins or produced in situ by a fermentation step.

It is possible to add at least one polyphenol of the family of flavonoids, cinnamic acids or phlorotannins. Preferably, the flavonoid is a flavanol, a flavonol, a chalcone, a flavone or an isoflavone.

According to the method of the invention, the natural product of plant origin is ground before being subjected to a solid/liquid separation step, preferably at a pH of less than 7 and more preferably still at a pH of less than 5.

Preferably, the natural product of plant origin is red cabbage, purple carrot or elderberry.

In one embodiment of the process according to the invention, the aldehyde(s) is (are) added in a quantity such that the aldehyde/anthocyanin molar ratio is between 1/10 and 2/1 relative to the quantity of anthocyanins present in the natural product of plant origin. Next, after stirring at a temperature greater than 0° C., the juice obtained is clarified before concentrating it in order to give a water-soluble product. Preferably, the stirring step is carried out at a temperature greater than 10° C.

In a preferred embodiment of the process of the invention, the aldehyde(s) is (are) added in an aldehyde/anthocyanin molar ratio strictly greater than 2/1 compared with the quantity of anthocyanins present in the natural product of plant origin. Next, after stirring at a temperature greater than 0° C., a liquid/solid separation of the two phases obtained is carried out. Preferably, the stirring step is carried out at a temperature greater than 10° C. It is then possible to concentrate the liquid phase in order to give a water-soluble product, and to dry the solid phase in order to give a non-water-soluble product.

Another subject of the invention consists in the use of a composition according to the invention as additive or ingredient during the manufacture of a food product.

Indeed, for the uses of such compositions in liquid products (for example drinks), a difference in hue is detectable by the human eye for an $\Delta Eab > 4$, in which $\Delta Eab = (\Delta a^{*2} + \Delta b^{*2} + \Delta L^2)^{1/2}$.

For the uses of such coloring compositions in solid products (for example yogurts), a difference in hue is detectable by the human eye for an $\Delta Eab > 2$, where $\Delta Eab = (\Delta a^{*2} + \Delta b^{*2} + \Delta L^2)^{1/2}$. These values are measured with a spectrocolorimeter in transmission mode for liquids and in reflection mode for solids.

The compositions according to the invention may be used in particular for coloring filling for cakes and cookies, and for coloring dairy products, drinks and confectionery products.

The coloring compositions according to the invention make it possible to replace synthetic colorings with natural colorings in some applications such as for example the coloring of the pulp of blood orange in Orangina™ "Orange sanguine", or the coloring of fruit pieces in yogurts. Furthermore, because of their structure which is different from that of conventional anthocyanins, some anthocyanins formed by the blueing reaction become insoluble in water, probably following polymerizations. This insoluble fraction makes it possible to color solids while avoiding the diffusion of the color into the surrounding matrix in the final application (e.g. red fruit pieces in yogurts).

The following examples illustrate the invention without at all limiting it.

EXAMPLE 1

Modification of Purple Carrot Anthocyanins by the Bathochromic Process of the Invention The purple carrot anthocyanins are extracted from the plant by steps of washing, grinding, pressing, clarification and then concentration of the juice obtained.

The aqueous solution of anthocyanins obtained by extraction of the natural anthocyanins of plant origin is concentrated so as to have a solution measuring about 40° brix.

Pure glyoxylic acid is added in a quantity such that the aldehyde/anthocyanin molar ratio is about 1. The hue obtained is dependent on this aldehyde/anthocyanin molar ratio. The solution is then stirred with the aid of a stirring blade having a rotating speed of 15 revolutions per minute at room temperature and in a closed reactor for 12 to 24 hours. After this stirring, the reaction between the aldehydes and the anthocyanins is stopped. The hue of the solution is more blue than the initial solution of anthocyanins.

Figure 2:
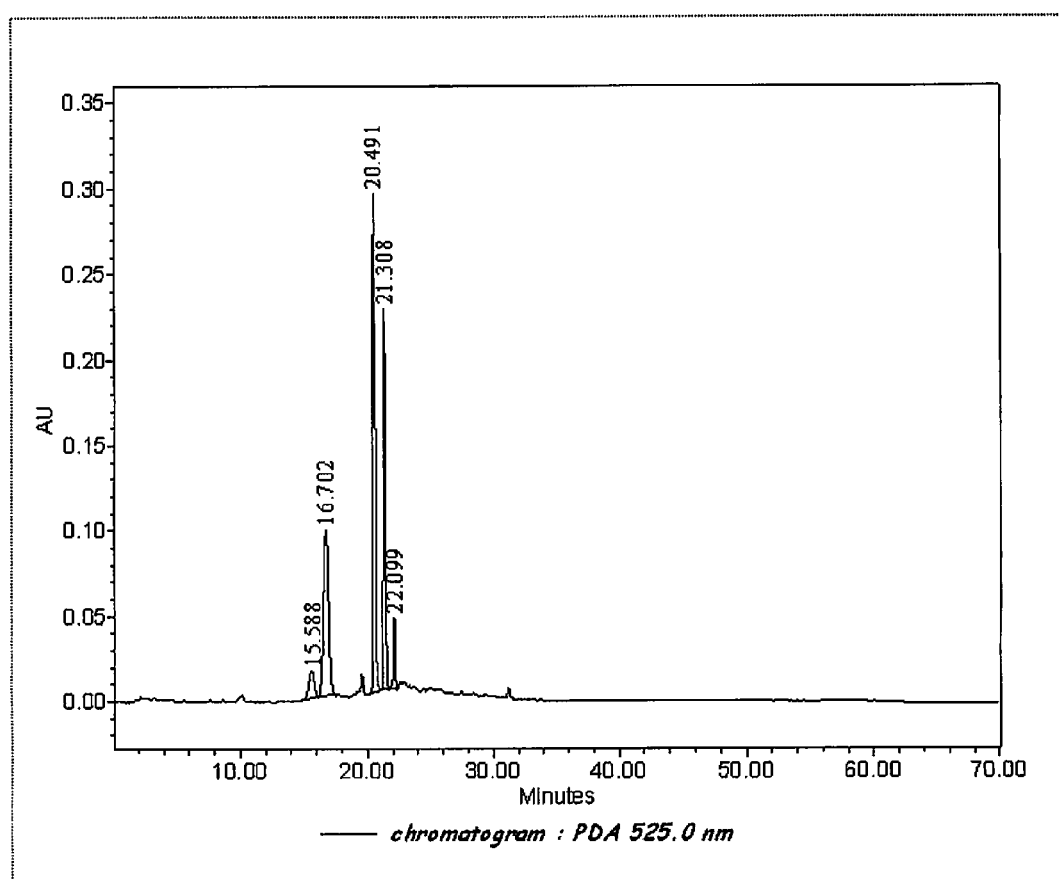
FIG. 2 presents an HPLC profile of a standard purple carrot concentrate (recorded at 525 nm).
Figure 3:
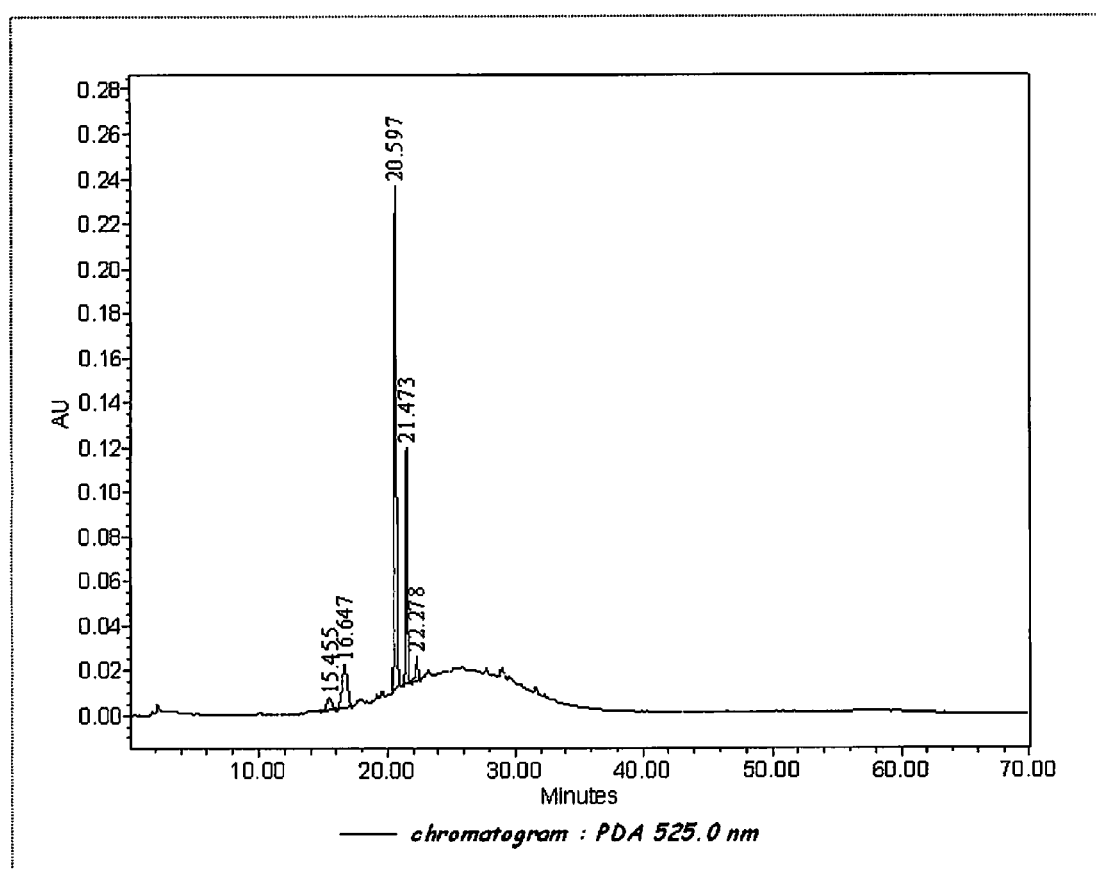
FIG. 3 presents an HPLC profile of purple carrot concentrate after the blueing reaction (recorded at 525 nm).

FIGS. 2 and 3 represent HPLC profiles obtained before and after the blueing reaction. FIG. 2 presents an HPLC profile of a standard purple carrot concentrate (recorded at 525 nm). FIG. 3 presents an HPLC profile of purple carrot concentrate after the blueing reaction (recorded at 525 nm).

The characteristic HPLC profile of a product having a hue that is more blue than its starting homolog exhibits an unresolved hump at the end of the profile (FIG. 2). The relative size of this unresolved hump is directly proportional to the blueing obtained. The higher the blueing, the larger the surface area of the unresolved hump relative to the characteristic peaks of the starting product.

EXAMPLE 2

Modification of the Value of b* as a Function of the Quantity of Aldehyde in Purple Carrot An aqueous glyoxylic acid solution at 100 g/L is prepared. This solution is added to the solution of purple carrot anthocyanins at 40° brix of example 1 above, so as to have a glyoxylic acid/purple carrot concentrate mass ratio of between 0 and 1%. This solution is then stirred with the aid of a stirring blade having a rotating speed of 15 revolutions per minute at room temperature and in a closed reactor for 24 hours.

Figure 4:
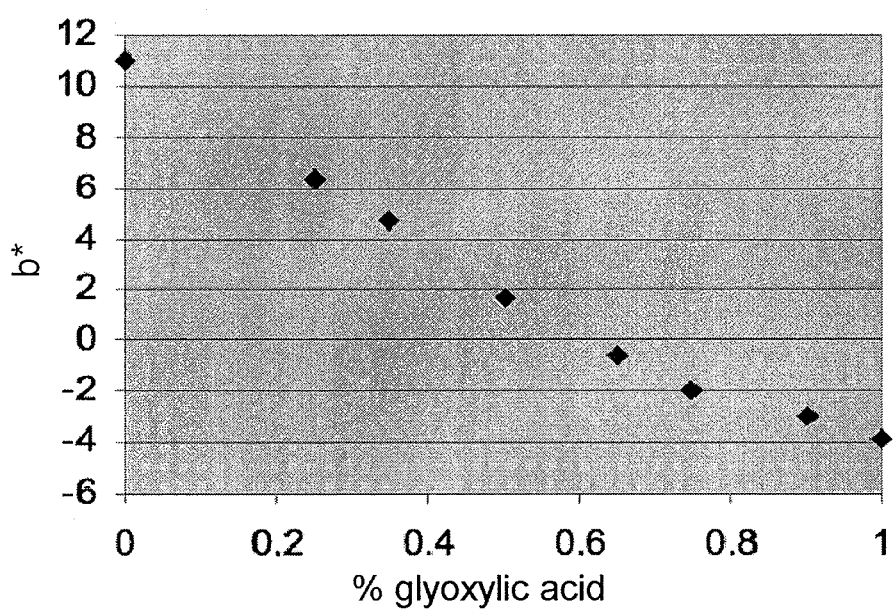
FIG. 4 shows the B* obtained after 24 h of reaction between the glyoxylic acid and the purple carrot anthocyanins.

FIG. 4 shows the b* obtained after 24 h of reaction between the glyoxylic acid and the purple carrot anthocyanins. The percentage of glyoxylic acid added is expressed as a function of the quantity of purple carrot concentrate. On adding 1% of glyoxylic acid to the purple carrot concentrate, a decrease in b* is obtained which passes from b*=11 to b*=−4 within 24 hours.

EXAMPLE 3

Coloring of a Drink

The addition of purple carrot concentrate having a standard hue (b*=8.5) to a drink with no other coloring makes it possible to obtain a colored drink whose b* value is between 8 and 8.5. The same experiment was carried out with the composition having a blue hue according to the invention, and having a b*=0, the measured b* value of the drink is between 0 and −0.5.

The concentrate may be incorporated into the drink in amounts ranging from 0.5 to 30%.

EXAMPLE 4

Coloring of a Yogurt

The addition of purple carrot concentrate having a standard hue (b*=8.5) to a yogurt with no other coloring makes it possible to obtain a colored yogurt whose b* value is between 8 and 8.5.

The same anthocyanin composition having a blue hue as above was used, and in this case, the measured b* of the yogurt is between 0 and −0.5. The quantity of purple carrot concentrate incorporated into the yogurt is 1%.

EXAMPLE 5

Coloring of a Cake Filling

The addition of purple carrot concentrate having a standard hue (b*=8.5) to a cookie filling with no other coloring makes it possible to obtain a colored filling whose b* value is between 8 and 8.5. The same anthocyanin composition having a blue hue as above was used, and in this case, the measured b* value of the filling is between 0 and −0.5.

The purple carrot concentrate is incorporated into the filling in an amount of 1%.

The invention claimed is:

1. A coloring composition having a blue hue comprising at least one modified anthocyanin which is the reaction product of an anthocyanin that is a natural product of plant origin and at least one aldehyde,
wherein the anthocyanin is a compound of formula (I):

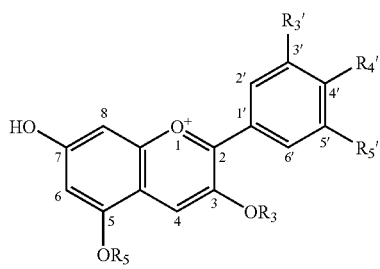

wherein $R_3'$, $R_4'$ and $R_5'$ are independently H, OH, or $OCH_3$ and $R_3$ and $R_5$ are independently H or an acetylated or non-acetylated glycoside, and
wherein the at least one aldehyde is selected from the group consisting of furaldehyde, glyoxylic acid, butyraldehyde, valeraldehyde, and isovaleraldehyde, and
wherein the modified anthocyanin has a reduction in b* of at least 5 units compared to the unmodified anthocyanin.

2. The coloring composition of claim 1, wherein the source of the anthocyanin that is the natural product of plant origin is red cabbage.

3. The coloring composition of claim 2, wherein the blue hue of the composition has a value of b* in the "1976 CIE L*a*b*" model that is less than −25, when L is at 65±0.5 and the measurements are carried out in an aqueous solution buffered to pH 3.00±0.05 at 20° C.

4. The coloring composition of claim 1, wherein the source of the anthocyanin that is the natural product of plant origin is purple carrot.

5. The coloring composition of claim 4, wherein the blue hue of the composition has a value of b* in the "1976 CIE L*a*b*" model that is less than 4, when L is at 65±0.5 and the measurements are carried out in an aqueous solution buffered to pH 3.00±0.05 at 20° C.

6. The coloring composition of claim 1, wherein the source of the anthocyanin that is the natural product of plant origin is elderberry.

7. The coloring composition of claim 6, wherein the blue hue of the composition has a value of b* in the "1976 CIE L*a*b*" model that is less than 5, when L is at 65±0.5 and the measurements are carried out in an aqueous solution buffered to pH 3.00±0.05 at 20° C.

8. A process for the bathochromic modification of colorings of the anthocyanin family, comprising:
obtaining a natural product of plant origin containing anthocyanins having formula (I):

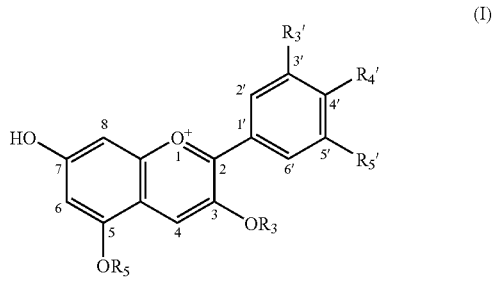

wherein $R_3'$, $R_4'$ and $R_5'$ are independently H, OH, or $OCH_3$ and $R_3$ and $R_5$ are independently H or an acetylated or non-acetylated glycoside; and
reacting the anthocyanins in the natural product of plant origin with at least one aldehyde selected from the group consisting of furaldehyde, glyoxylic acid, butyraldehyde, valeraldehyde, and isovaleraldehyde.

9. The process of claim 8, wherein the bathochromic modification makes it possible to obtain a reduction in b* of at least 5 units in the modified anthocyanins compared with the unmodified anthocyanins, in a "1976 CIE L*a*b*" model system, when L is at 65±0.5 and the measurements are carried out in an aqueous solution buffered to pH 3.00±0.05 at 20° C.

10. The process of claim 8, wherein the at least one aldehyde is furaldehyde.

11. The process of claim 8, wherein the at least one aldehyde is glyoxylic acid.

12. The process of claim 8, wherein at least one polyphenol of the family of flavonoids, or phlorotannins is added.

13. The process of claim 12, wherein the flavonoid is a flavanol, a flavonol, a chalcone, a flavone or an isoflavone.

14. The process of claim 8, wherein the natural product of plant origin is ground before being subjected to a solid/liquid separation step.

15. The process of claim 14, wherein the natural product of plant origin is ground at a pH of less than 7.

16. The process of claim 14, wherein the natural product of plant origin is ground at a pH of less than 5.

17. The process of claim 8, wherein the natural product of plant origin is red cabbage, purple carrot, or elderberry.

18. The process of claim 8, wherein the aldehyde(s) is (are) added in a quantity such that the aldehyde/anthocyanin molar ratio is between 1/10 and 2/1 relative to the quantity of anthocyanins present in the natural product of plant origin.

19. The process of claim 8 further comprising stirring the natural product of plant origin with the at least one aldehyde at a temperature greater than 0° C., to obtain a juice that is clarified then concentrated to obtain a water-soluble product.

20. The process of claim 8, wherein the aldehyde(s) is (are) added in an aldehyde/anthocyanin molar ratio strictly greater than 2/1 compared with the quantity of anthocyanins present in the natural product of plant origin.

21. The process of claim 8 further comprising stirring the natural product of plant origin with the at least one aldehyde at a temperature greater than 0° C., followed by performing a liquid/solid separation of two phases.

22. The process of claim 21, further comprising concentrating the liquid phase to obtain a water-soluble product.

23. The process of claim 21, further comprising drying the solid phase to obtain a non-water-soluble product.

24. A method for coloring food comprising adding to food a coloring composition having a blue hue, wherein the composition comprises at least one modified anthocyanin which is the reaction product of an anthocyanin that is a natural product of plant origin and at least one aldehyde, wherein the anthocyanin is a compound of formula (I):

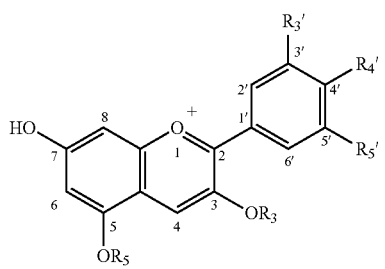

wherein $R_3'$, $R_4'$ and $R_5'$ are independently H, OH, or $OCH_3$ and $R_3$ and $R_5$ are independently H or an acetylated or non-acetylated glycoside, and wherein the at least one aldehyde is selected from the group consisting of furaldehyde, glyoxylic acid, butyraldehyde, valeraldehyde, and isovaleraldehyde.

25. The method of claim 24, further defined as a method of manufacturing a food product.

26. The method of claim 24, wherein the food is filling for cakes and/or cookies.

27. The method of claim 24, wherein the food is a dairy product.

28. The method of claim 24, wherein the food is a drink.

29. The method of claim 24, wherein the food is a confectionery product.

* * * * *

UNITED STATES PATENT AND TRADEMARK OFFICE
CERTIFICATE OF CORRECTION

| | | |
|---|---|---|
| PATENT NO. | : 8,425,960 B2 | Page 1 of 1 |
| APPLICATION NO. | : 12/593503 | |
| DATED | : April 23, 2013 | |
| INVENTOR(S) | : Inisan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 485 days.

Signed and Sealed this
Second Day of December, 2014

Michelle K. Lee
*Deputy Director of the United States Patent and Trademark Office*